United States Patent [19]

Hallerbäck et al.

[11] 4,167,683
[45] Sep. 11, 1979

[54] ELECTRIC MOTOR FOR DISH WASHING MACHINES OR THE LIKE

[75] Inventors: Stig L. Hallerbäck, Göthenburg; Leif Lachonius, Surte, both of Sweden

[73] Assignee: Aktiebolaget SKF, Gothenburg, Sweden

[21] Appl. No.: 828,899

[22] Filed: Aug. 29, 1977

[30] Foreign Application Priority Data

Oct. 6, 1976 [SE] Sweden ............................... 7611054

[51] Int. Cl.² ............................................. H02K 9/06
[52] U.S. Cl. ........................................ 310/63; 310/62; 310/65; 310/157
[58] Field of Search ....................... 310/52, 89, 58, 91, 310/59, 62, 63, 64, 65, 68 D, 157

[56] References Cited

U.S. PATENT DOCUMENTS

| | | | |
|---|---|---|---|
| 1,659,623 | 2/1928 | Barr | 310/64 |
| 1,681,915 | 8/1928 | Barr | 310/64 |
| 1,685,677 | 9/1928 | Maxwell | 310/64 |
| 2,385,264 | 9/1945 | Ferris | 134/188 |
| 2,422,824 | 6/1947 | Clauson | 310/52 |
| 3,341,113 | 9/1967 | Sebok | 310/62 |
| 3,749,953 | 7/1973 | Baumann | 310/62 |
| 3,903,443 | 9/1975 | Van Carlson | 310/91 |

FOREIGN PATENT DOCUMENTS

1356490 6/1974 United Kingdom .

Primary Examiner—R. Skudy
Attorney, Agent, or Firm—Eugene E. Renz, Jr.

[57] ABSTRACT

An electric motor attached at one axial end to a frame for a dishwashing machine or the like and which at its opposite free end is provided with a cooling blower for generating air jets. The improvement comprises cooling channels for the air arranged around the stator, the cooling channels having outlet openings for the cooling air facing the frame and situated at a predetermined distance from the frame with the exception of one or some of the channels at one side of the motor which in combination with the frame are closed in an axial direction and are provided with outlet openings for the cooling air so that the cooling air is directed inwardly against the shaft at the end of the motor turned towards the frame.

4 Claims, 4 Drawing Figures

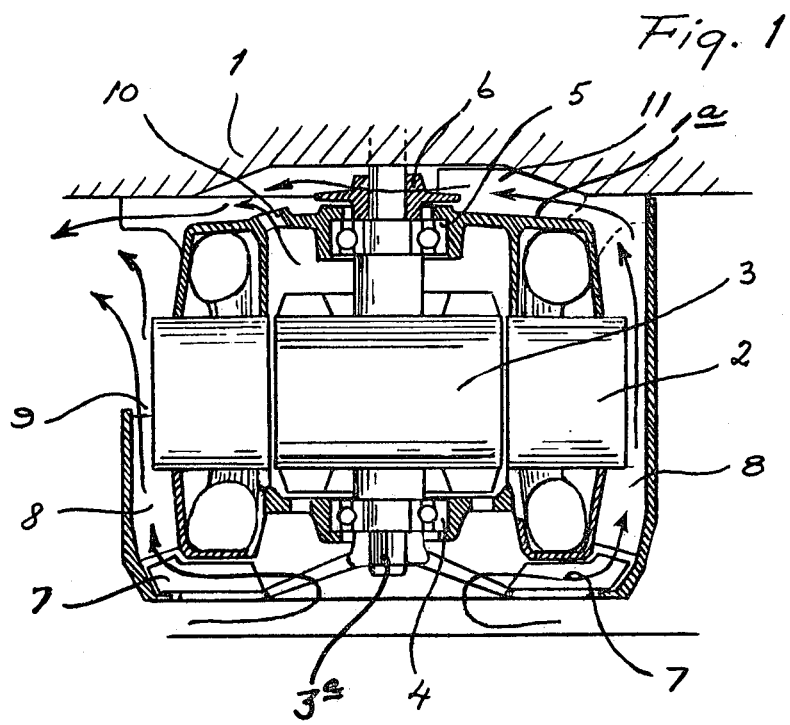
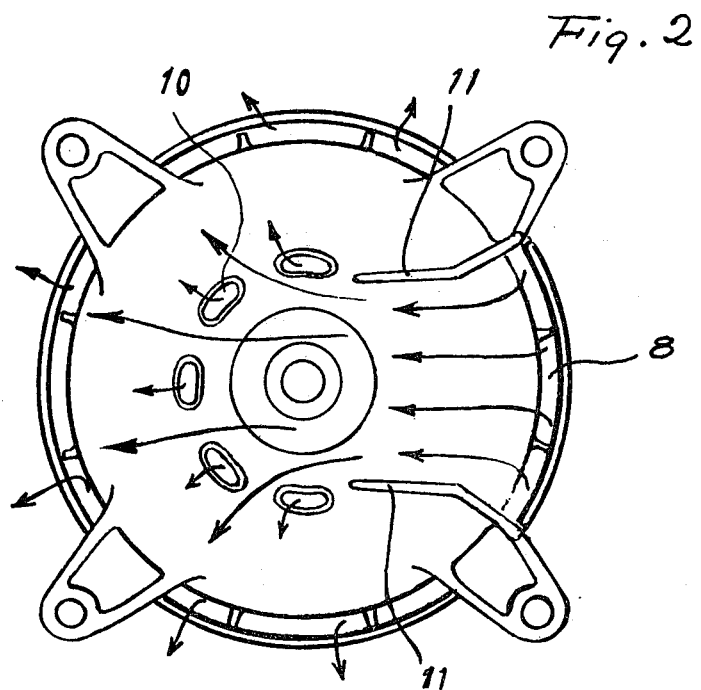

ELECTRIC MOTOR FOR DISH WASHING MACHINES OR THE LIKE

BACKGROUND OF THE INVENTION

The present invention refers to electric machines, which at one of their ends are connected to a frame such as a dish washing machine or the like.

Electric motors which at one of their ends is fixed to some frame in such a manner that there is very little space between the motor and the frame can be hard to cool efficiently at the end turned towards the frame. The reason for this is primarily that air will be trapped between the motor and the frame and that the very frame oftenly is heated. This holds true particularly at dish washing machines, which have an interior temperature near the boiling point of water.

A method for solving the cooling problem at the end fixed to the frame could be to produce air jets through the rotor cavity, which air jets could leave said cavity centrally at the bearing and then flow radially outwards. Due to the very small air gap between the rotor and the stator is it however difficult to bring about an efficient air flow in that manner. Making channels in the shaft or in the rotor itself is also inappropriate for different reasons.

SUMMARY OF THE INVENTION

The present invention however presents a solution to the above-mentioned problem and it has been provided an electric motor, which at one of its axial ends is attached to a frame for instance a dish washing machine and which at its free end is provided with a cooling blower for generating cooling air jets, and which is mainly characterized thereby that channels for the cooling air are arranged around the stator, which channels have outlet openings for the cooling air facing the frame and situated at a certain distance from this with the exception of one or some channels at one side of the motor, which possibly with aid of the frame are closed in axial direction and instead are provided with outlet openings for the cooling air directed inwards against the shaft at the end of the motor turned towards the frame.

It is suitable to arrange guide vanes on the end of the motor turned towards the frame for guiding the radial air flow over the central portions of that end.

In order to facilitate the escape of the air from the rotor cavity is it possible to arrange openings in the motor end through which openings air can flow partly due to ejector action caused by the deflected air flow.

Another method for guiding the air flow in over the end of the motor is to deflect it by means of guide vanes into the very rotor cavity around the bearing.

BRIEF DESCRIPTION OF THE DRAWING

The invention will hereinafter be described more in detail with reference to the accompanying drawings.

FIG. 1 shows in a longitudinal section a dish washing machine motor according to the invention, FIG. 2 is the same motor as seen from above.

DESCRIPTION OF A SPECIFIC EMBODIMENT

Figure 3:
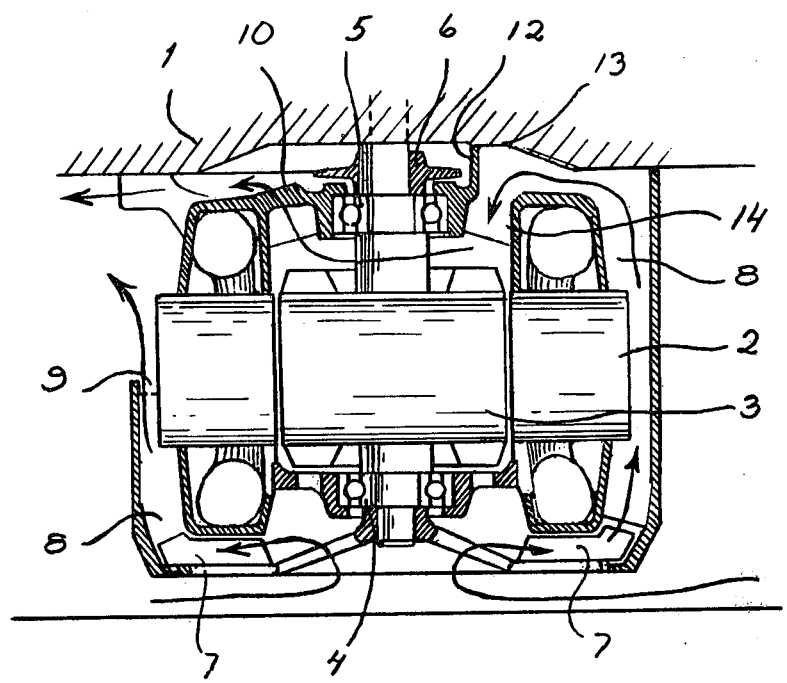
FIG. 3 shows another embodiment of the motor according to FIG. 1.

The motor according to FIG. 1 is attached to the bottom portion 1 of a dish washing machine. The motor includes an end wall 1a, a stator 2 and a rotor 3, which latter is supported in bearings 4 and 5. The rotor shaft 3a is further provided with a deflector 6 adapted to protect the upper bearing. At the free end of the motor there is arranged a blower 7, mounted on the free end of the rotor shaft remote from the frame, which blows cooling air in through the channels 8 in the direction shown by the arrows. The channel as seen at the left hand side of the figure has an opening 9 at a distance from the bottom portion 1 of the disc washing machine and the air in this channel is allowed to escape freely. If all the channels were made in the same manner as this channel should the air in the space between the dish washing machine and the motor become nearly immobile and the temperature in the bearing 5 should accordingly rise considerably. This would lead to degradation of the lubricating grease and it would jeopardize the function of the bearing. In order to obtain an efficient cooling of this bearing some of the channels at the right hand side of the drawing have therefore been allowed to extend up to the dish washing machine bottom and to seal off against this. The air in these channels must then flow inwards and over the end such as shown by the arrows. An efficient cooling of the upper bearing 5 is therby obtained. This air flow will also cause a certain flow of air through the rotor portion and outlet openings 10 have therefore been arranged in the end wall.

In addition to the feature of some channels being closed against the dish washing machine bottom for deflection of air inwards there are also arranged guide vanes 11 for the same purpose.

FIG. 2 shows a motor according to FIG. 1 as seen from above and it can be seen that three channels on the right hand side have been extended until the dish washing machine bottom, whereby the air in these channels by means of the guide vanes 11 is brought to flow over the central portions of the motor end such as shown by the arrows.

Figure 4:
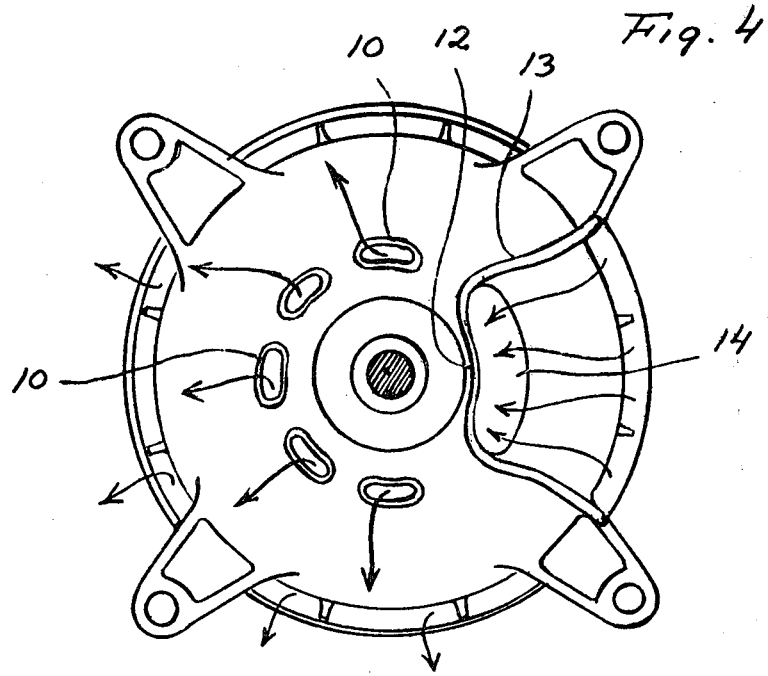
FIG. 4 shows a motor according to FIG. 3 as seen from above.

The motor shown in FIGS. 3 and 4 is similar to that according to FIGS. 1 and 2 but the flow of air has in this case by means of guide vanes 12 and 13 and the opening 14 been deflected down into the rotor cavity and the flow is there allowed to move around the bearing 5 in order thereupon to escape through the openings 10. A somewhat more efficient cooling of the very bearing can be obtained in this case in comparison to the first mentioned case.

The invention is not limited to the embodiments shown but can be modified in several manners within the scope of the appended claims.

We claim:

1. An electric motor assembly comprising a casing adapted to be mounted at one axial end to a frame of a machine, a stator mounted in said casing and spaced therefrom including means defining circumferentially spaced, axial air channels circumscribing said stator, a rotor including a shaft journalled in bearings at opposite ends of said stator, a blower mounted on the free end of said rotor shaft remote from said frame operable to circulate cooling air through said channels, means defining outlet openings for some of said channels spaced axially from said frame at one side of the motor, said other channels being closed in an axial direction adjacent said frame so that air is directed radially towards said shaft at said one axial end, an end wall at one axial end of the motor spaced from the frame and at least one pair guide vanes projecting from said end wall toward the frame for guiding air flow from said other axial channels and directing it radially over in the space between said end wall and frame over the central portion of the end wall.

2. An electric motor as claimed in claim 1 wherein said axial channels are defined by a series of circumferentially spaced axial ribs extending between the outer periphery of said stator and the interior of said casing.

3. An electric motor assembly comprising a casing adapted to be mounted at one axial end to a frame of a machine, stator mounted in said casing and spaced therefrom including means defining circumferentially spaced, axial air channels circumscribing said stator, a rotor journalled in bearings at opposite ends of said stator, a blower mounted on the free end of said rotor remote from said frame operable to circulate cooling air through said channels, means defining outlet openings for some of said channels spaced axially from said frame at one side of the motor, said other channels being closed in an axial direction adjacent said frame so that air is directed radially towards said shaft at said one axial end, an end wall at one axial end of the motor spaced from the frame and first openings in said end wall to permit flow of air from the rotor cavity.

4. An electric motor as claimed in claim 3 including a continuous guide flange projecting axially from said end wall and extending radially inwardly from the casing to define an enclosure for air passing upwardly in some of said axial channels, a second opening in said end wall on the side of said flange opposite said first openings whereby cooling air from said other axial channels is deflected downwardly by said flange through said second opening into the rotor cavity and then through said first openings.

* * * * *